(12) United States Patent
Hunter

(10) Patent No.: US 11,702,009 B1
(45) Date of Patent: Jul. 18, 2023

(54) SIDE VIEW MIRROR WIPING MECHANISM

(71) Applicant: Levada R. Hunter, Mesquite, TX (US)

(72) Inventor: Levada R. Hunter, Mesquite, TX (US)

( * ) Notice: Subject to any disclaimer, the term of this patent is extended or adjusted under 35 U.S.C. 154(b) by 70 days.

(21) Appl. No.: 17/363,807

(22) Filed: Jun. 30, 2021

(51) Int. Cl.
   *B60R 1/06* (2006.01)
   *B60S 1/56* (2006.01)
   *B60S 1/04* (2006.01)

(52) U.S. Cl.
   CPC .......... *B60R 1/0602* (2013.01); *B60S 1/0441* (2013.01); *B60S 1/0497* (2013.01); *B60S 1/566* (2013.01)

(58) Field of Classification Search
   CPC .......... B60S 1/56; B60S 1/566; B60S 1/0433; B60S 1/0441; B60S 1/0497; B60S 1/0413; B60S 1/60; B60R 1/0602; B60R 2011/004
   USPC ...................................... 15/250.003, 250.002
   See application file for complete search history.

(56) References Cited

U.S. PATENT DOCUMENTS

| 3,526,920 | A | | 9/1970 | Boyanich, Sr. |
| 3,855,661 | A | | 12/1974 | Prince |
| 3,968,537 | A | | 7/1976 | Wagenhofer |
| 5,634,234 | A | * | 6/1997 | Allain .................... B60S 1/3404 15/250.04 |
| D420,315 | S | | 2/2000 | Hardy |
| 6,546,590 | B2 | | 4/2003 | Waters |
| 6,654,982 | B1 | | 12/2003 | Coman |
| 6,691,365 | B2 | | 2/2004 | Graf |
| 7,540,060 | B2 | | 6/2009 | Holmes |
| 7,574,769 | B1 | | 8/2009 | Nemeth |
| 7,856,693 | B1 | | 12/2010 | Johnson |

* cited by examiner

*Primary Examiner* — Gary K. Graham
(74) *Attorney, Agent, or Firm* — Cramer Patent & Design, PLLC; Aaron R. Cramer

(57) ABSTRACT

A side view mirror wiping mechanism has a wiper blade assembly being removably attachable to a side view mirror. The wiper blade assembly is in electrical communication with a solar energy power source and is actuated via a wireless remote. The solar energy power source is wrapped about the outer surface of the side view mirror.

20 Claims, 5 Drawing Sheets

SIDE VIEW MIRROR WIPING MECHANISM

RELATED APPLICATIONS

None.

FIELD OF THE INVENTION

The present invention relates generally to a mirror wiping device and specifically to a mirror wiping device for a side view mirror.

BACKGROUND OF THE INVENTION

Everyone realizes the importance of maintaining clean windshields and mirrors with regards to driving safety. While wiper systems are readily available for windshields and even some rear windows of vehicles, side-view mirrors are left on their own. This forces the driver to manually clean these mirrors which can be difficult, especially when driving in heavy rain or snow. For truck drivers, this problem is more severe for several reasons.

First, these side view mirrors are all they have to rely on, since they do not have a rear-view mirror. Second, these mirrors are high off of the ground, making it difficult to clean them when stopped at a truck stop. Finally, stopping to repeatedly clean these mirrors, cuts into their profits due to the increased travel time and poses a safety risk to other vehicles when stopped in inclement weather. Accordingly, the need has arisen for a means by which side-view mirrors on trucks and other large vehicles can be easily cleaned in a quick, easy and effective manner, thus improving driving safety for all on the road. The development of the attachable wiper device for side-view mirrors fulfills this need.

SUMMARY OF THE INVENTION

To achieve the above and other objectives, the present invention provides for an attachable wiper device having a frame, an enclosure which has a top, a center, a side, a wiper arm having an interior, a wiper frame which is mechanically connected to a distal end of the wiper arm via a pivoting mechanism, a knuckle which is mechanically connected to the wiper arm and the wiper frame; and a replaceable rubber wiping strip which is secured to the wiper frame. The enclosure is temporarily attached to the frame using a clear elastic strip. The clear elastic strip will adapt to a different-sized frame to allow for a tight friction fit that remains in place while a vehicle is traveling high speeds. The wiper arm extends from the center of the enclosure. The wiper frame travels back and forth across a glass mirror surface along a blade travel path and the pivoting mechanism keeps the wiper frame in a near vertical position.

An outer surface of the enclosure may be equipped with a photovoltaic panel that provides a plurality of electric power for the attachable wiper device. The photovoltaic panel may curve around the top of the enclosure and the side of the enclosure such that one or more surfaces of the photovoltaic panel may be intercepting a plurality of incoming sun rays whether they are high or low in a sky. The electric power as gathered by the photovoltaic panel may be stored in a plurality of rechargeable batteries allowing for operation of the attachable wiper device during nighttime hours, during times of diminished ambient lighting, during a rainstorm or during a snowstorm.

The photovoltaic panel may continuously recharge the rechargeable batteries whether or not an electric motor is operating via a charge controller. The knuckle may be connected to a reciprocating gearing mechanism which converts a rotary action of the electric motor to a back-and-forth action required by the blade travel path. The charge controller may pull electric power from either the photovoltaic panel or the rechargeable batteries depending on an ambient light level available when the electric power is required by the attachable wiper device. The electric power may be generated by the photovoltaic panel is routed to the charge controller.

The attachable wiper device may further have a wireless receiver allows remote operation of the electric motor, a remote-control FOB that generates an RF signal which communicates with an antenna connected to the wireless receiver. The interior of the wiper arm may include a tension spring to ensure that the wiper frame maintains adequate contact with the glass mirror surface. The remote-control FOB may be equipped with a left mirror pushbutton and a right mirror pushbutton to allow a driver to select either a driver's side view mirror equipped with the attachable wiper device or a passenger side mirror equipped with the attachable wiper device respectively.

The driver may push an activation pushbutton to activate the electric motor once selected by either the left mirror pushbutton or the right mirror pushbutton. The remote-control FOB may be powered by a long-life user-replaceable coin-style battery. The attachable wiper device may be an add-on device for remote cleaning of a mirror on the vehicle using a large rear view mirror selected from the group consisting of a tractor-trailer rig, a travel bus, a school bus, a recreational vehicle coach, or a piece of farm equipment. The mirror may include the glass mirror surface, an auxiliary mirror, a mirror frame, and a support arm. The mirror may be a driver's side view mirror. The mirror may be a passenger side view mirror. The attachable wiper device may be manually installed without one or more tools. The attachable wiper device may not require the use of one or more dash-mounted switches or one or more permanent alterations to an interior of the vehicle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
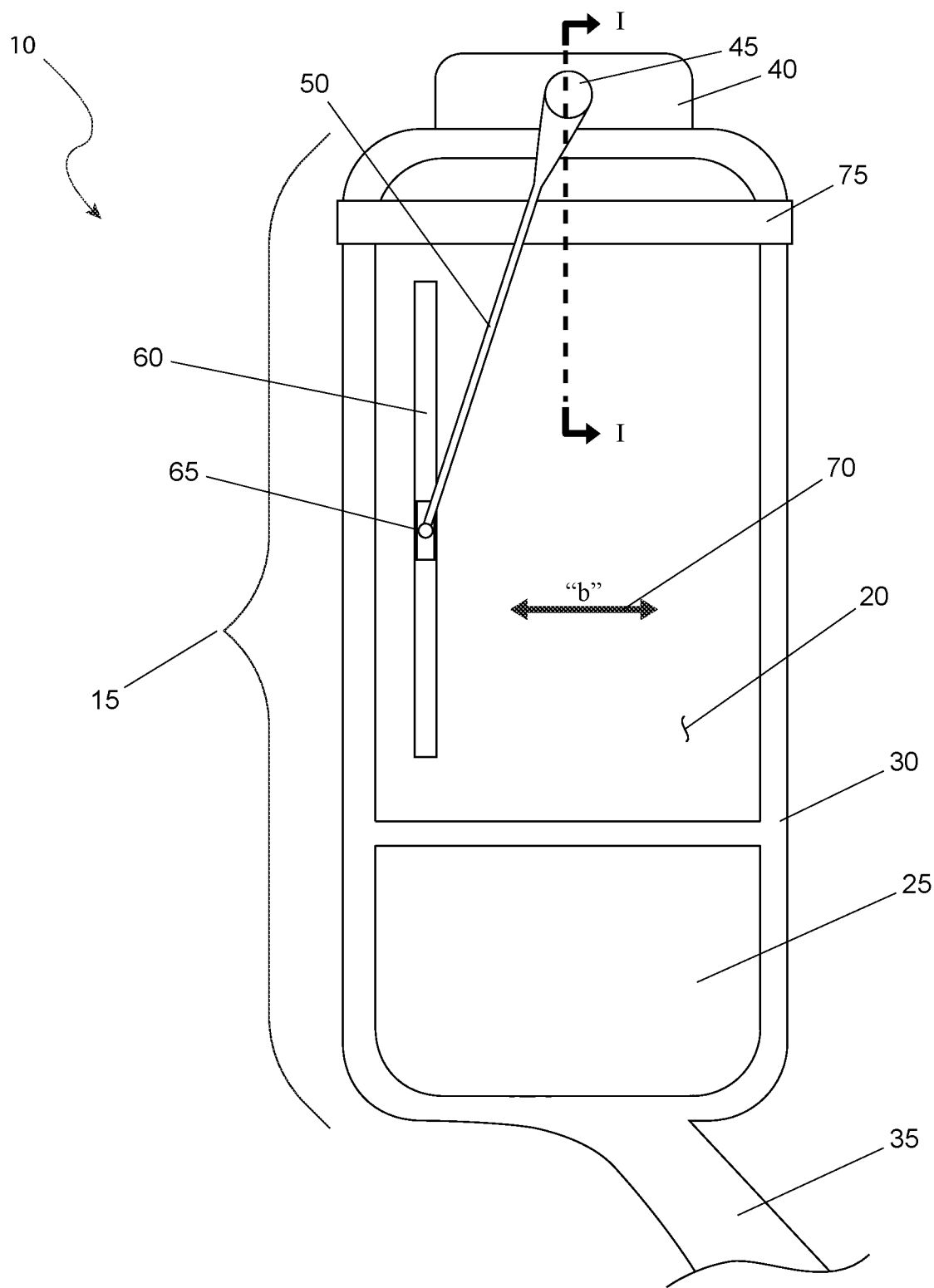
FIG. 1 is a front view of the attachable wiper device, according to the preferred embodiment of the present invention.

10 attachable wiper device
15 mirror 20 glass mirror surface
25 auxiliary mirrors
30 frame
35 support arm
40 enclosure
45 knuckle
50 wiper arm
60 wiper frame
65 pivoting mechanism
70 blade travel path "b"
75 clear elastic strip
80 rear mirror body
85 photovoltaic panel
90 installation removal travel path "d"
95 rubber wiping strip
100 incoming sun rays
105 tension spring
110 reciprocating gearing mechanism
115 electric motor
120 rechargeable batteries
125 charge controller
130 wireless receiver
135 remote control fob
140 RF signal
145 antenna
150 left mirror pushbutton
155 right mirror pushbutton
160 activation pushbutton

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a front view of the attachable wiper device 10, according to the preferred embodiment of the present invention is disclosed. The attachable wiper device (herein also described as the "device") 10, is an add-on device 10 to provide for remote cleaning of mirrors 15 on tractor-trailer rigs and other large vehicles. The mirror 15 includes customarily expected components such as a glass mirror surface 20, an auxiliary mirror 25, a frame 30, and a support arm 35. The mirror 15 as depicted is exemplary in nature. Other styles of mirror 15 may also benefit from the teachings of the present invention. As such, the use of the device 10 with any particular type of mirror 15 is not intended to be a limiting factor of the present invention. The features of the device 10 may be utilized on the driver's side view mirror 15, the passenger side view mirror 15, or both simultaneously.

The device 10 provides for an enclosure 40, here visible in FIG. 1, but mainly installed on the rear of the mirror 15, as will be shown herein below. The center of the enclosure 40 is provided with a wiper arm 50, which is mechanically connected to a wiper arm 50. The distal end of the wiper arm 50 is then connected to a wiper frame 60 via a pivoting mechanism 65. The pivoting mechanism 65 keeps the wiper frame 60 in a near vertical position as shown. The wiper frame 60, envisioned to be approximately six inches to eight inches (6-8 in.) in length, is shown in a stored position at one (1) side of the glass mirror surface 20 (note that either side of the glass mirror surface 20 can be used as the stored position) where it will not interfere with vision using the mirror 15 when the device 10 is not operating. The wiper frame 60 travels back and forth across the glass mirror surface 20 along a blade travel path "b" 70, in much the same manner as a conventional wiper travels along a windshield surface. Finally, the enclosure 40 is temporarily attached to the frame 30 using a clear elastic strip 75. The clear elastic strip 75 will adapt to different-sized frames 30 to allow for a tight friction fit that remains in place while the vehicle is traveling down the road at highways speeds. The device 10 is intended for use on tractor-trailer rigs, travel busses, school busses, recreational vehicle coaches, farm equipment, and any vehicle that uses large rear-view mirrors 15.

Figure 2:
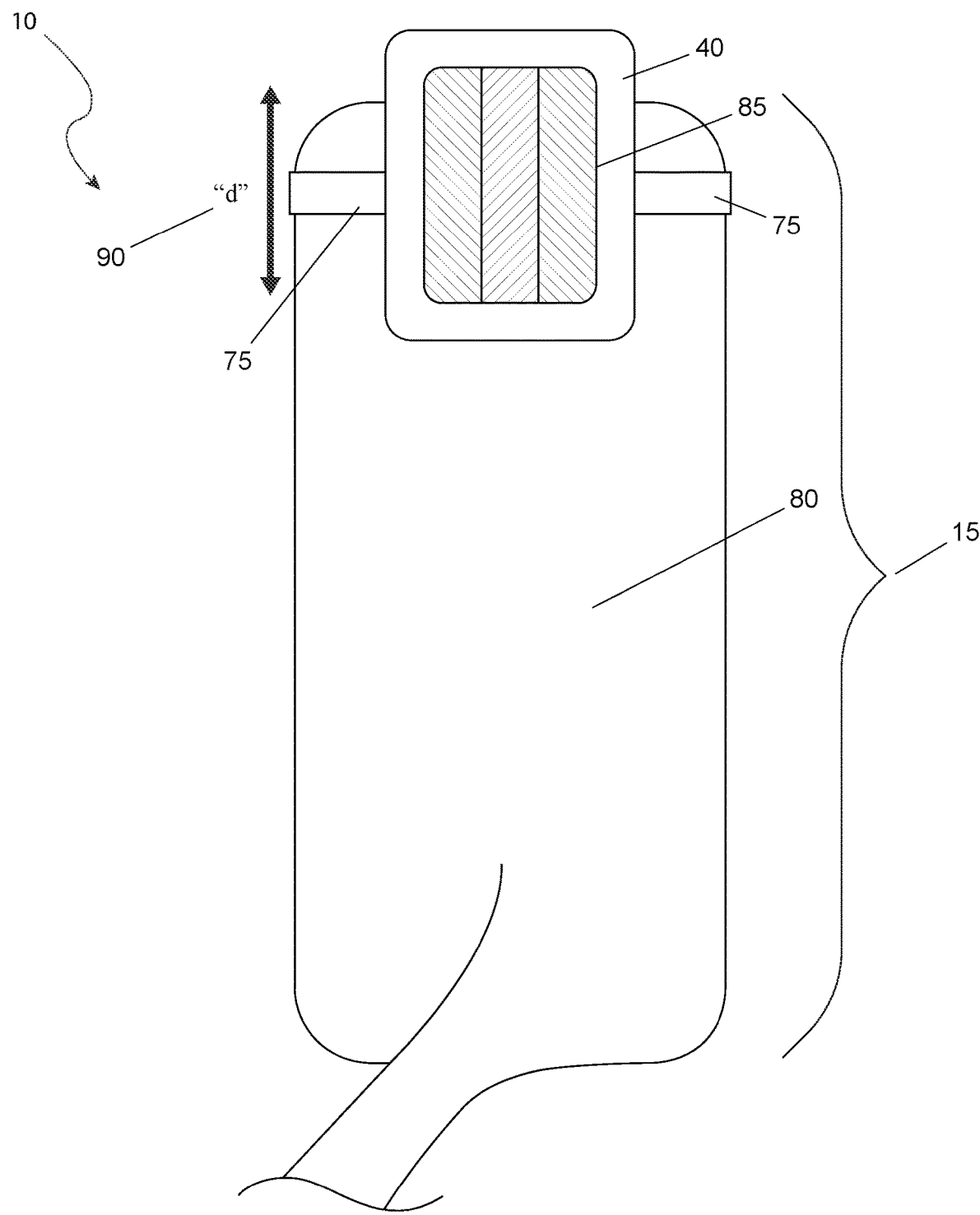
FIG. 2 is a rear view of the attachable wiper device, according to the preferred embodiment of the present invention.

Referring next to FIG. 2, a rear view of the device 10, according to the preferred embodiment of the present invention is depicted. This view discloses the rear mirror body 80. The enclosure 40 sits atop the rear mirror body 80 whereupon it is held in place with the clear elastic strip 75. The outer surface of the enclosure 40 is equipped with a photovoltaic panel 85. The photovoltaic panel 85 provides electrical power for the device 10. No other external sources of power are provided to the device 10 such as from the vehicles electrical system. The location of the enclosure 40 on the rear mirror body 80 does not interfere with any functionality of the mirror 15. The device 10 can be easily applied and removed from the mirror 15 along an installation removal travel path "d" 90.

Figure 3:
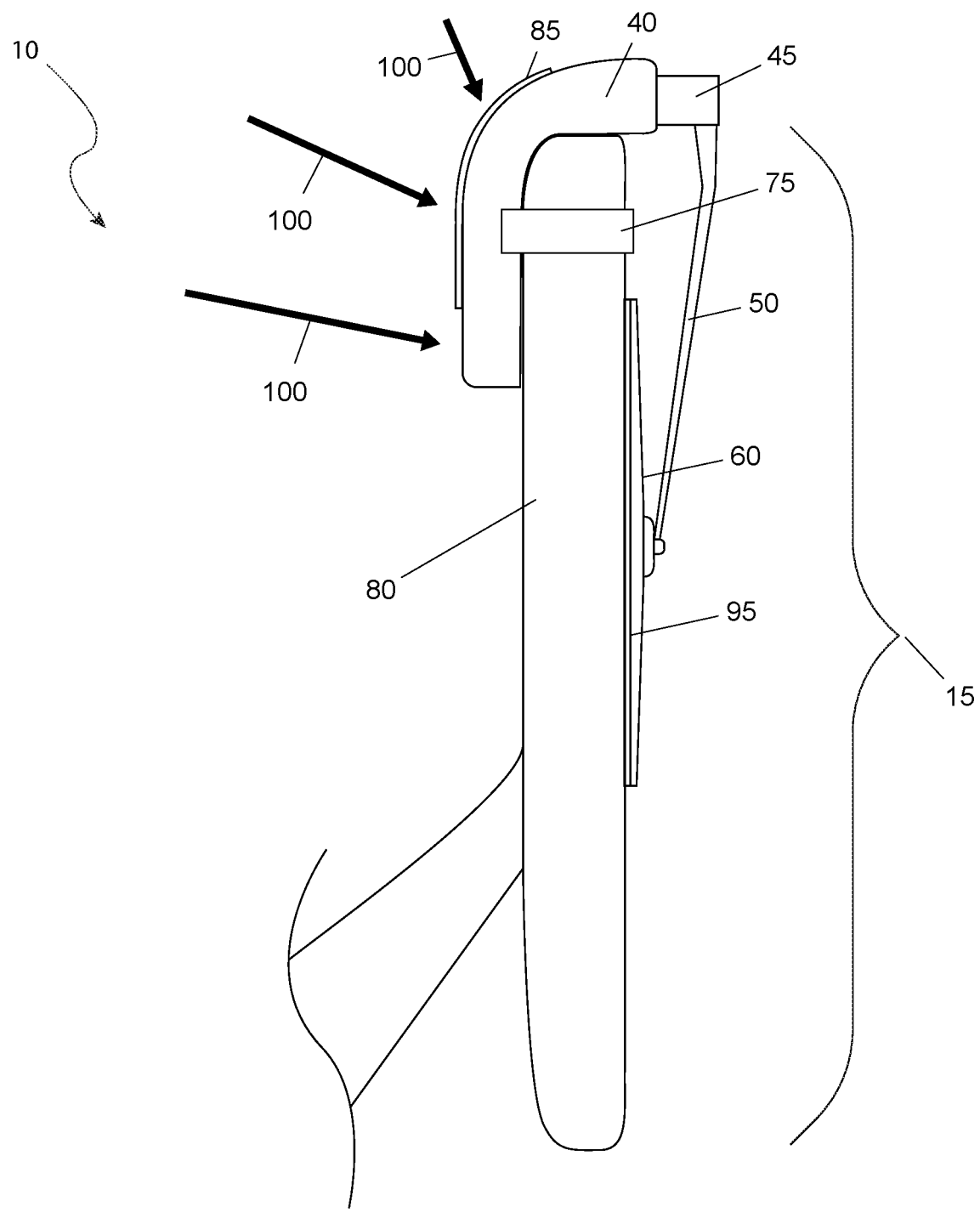
FIG. 3 is a side view of the attachable wiper device, according to the preferred embodiment of the present invention.

Referring now to FIG. 3, a side view of the device 10, according to the preferred embodiment of the present invention is shown. The enclosure 40 is set upon the rear mirror body 80 and secured in place via the clear elastic strip 75 as forementioned described. The knuckle 45 is mechanically connected to the wiper arm 50 and subsequently the wiper frame 60. A rubber wiping strip 95, envisioned to be of the replaceable nature when worn, is secured to the wiper frame 60. The photovoltaic panel 85 curves around the top and side of the enclosure 40 such that one or more surfaces (areas) of the photovoltaic panel 85 are capable of intercepting the incoming sun rays 100 whether they are high or low in the sky. The side view also further details the easy removability and installation process of the device 10 which occurs without the use of tools in a manner of several seconds. The ease allows for the usage of the features of the device 10 on multiple different mirrors 15 without any permanent mechanical attachment and when removed, leaves no telltale marks behind. Such a feature is envisioned on beneficial on trucks that are rented or leased and must be returned after the rental or lease period in the same mechanical condition at the beginning of the lease or rental position. The device 10 is also ideal for use by a specific driver who values the features and added safety of the device 10 but may drive different vehicle during any time period.

Figure 4:
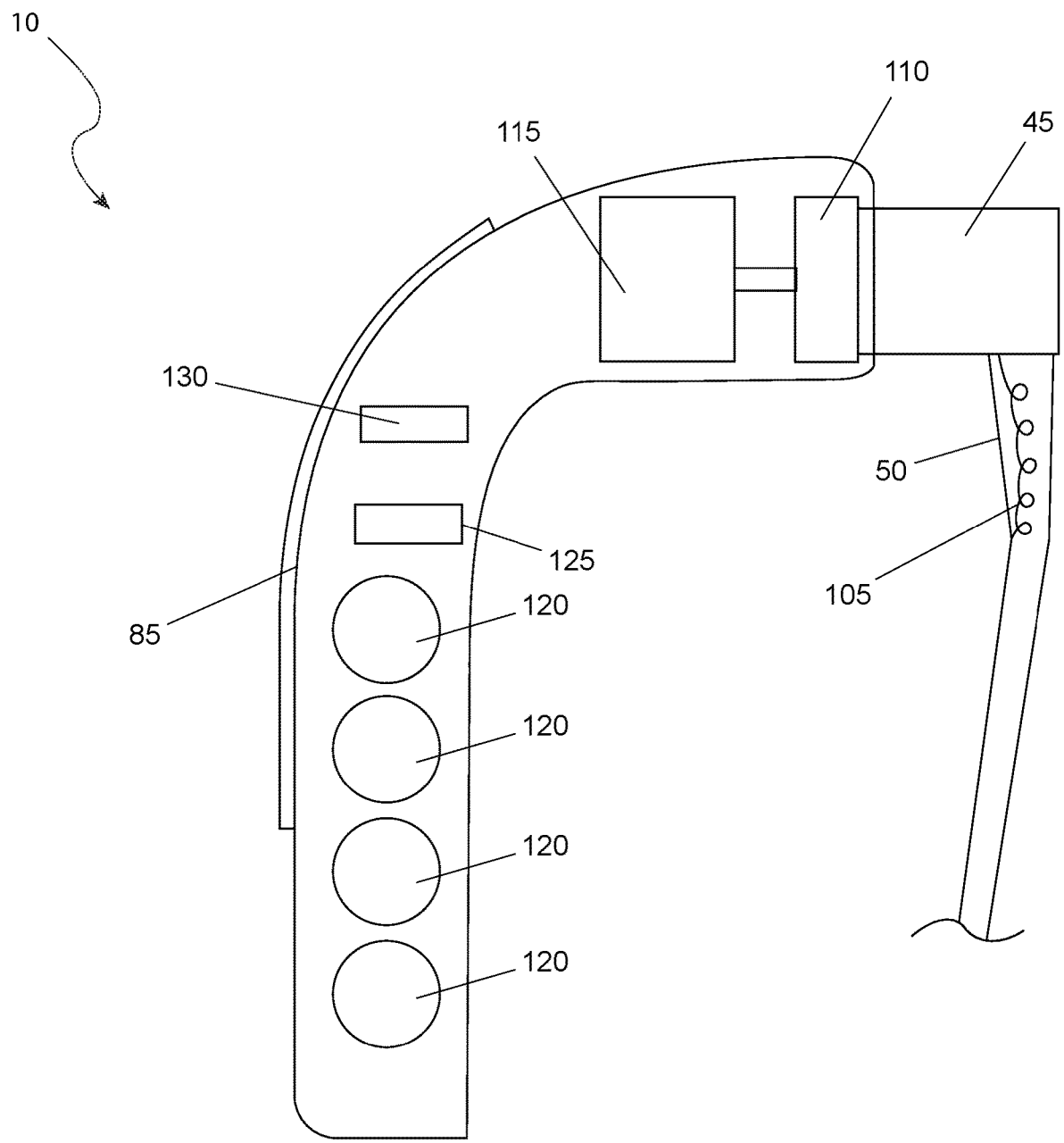
FIG. 4 is a sectional view of the attachable wiper device, as seen along a Line I-I, as shown in FIG. 1, according to the preferred embodiment of the present invention; and, FIG. 5 is an electrical block diagram of the attachable wiper device, according to the preferred embodiment of the present invention.

Referring next to FIG. 4, a sectional view of the device 10, as seen along a Line I-I, as shown in FIG. 1, according to the preferred embodiment of the present invention is disclosed. The interior of the wiper arm 50 is provided with a tension spring 105 to ensure that the wiper frame 60 (as shown in FIG. 1) maintains adequate contact with the glass mirror surface 20 (a shown in FIG. 1). The knuckle 45 is connected to a reciprocating gearing mechanism 110 which converts the rotary action of an electric motor 115 to the back-and-forth action required by the blade travel path "b" 70 (as shown in FIG. 1). The electric power as gathered by the photovoltaic panel 85 is stored in multiple rechargeable batteries 120 thus allowing for operation of the device 10 during night time hours, or during times of diminished ambient lighting such as during a rain storm or snow storm. The photovoltaic panel 85 continuously recharges the rechargeable batteries 120 whether or not the electric motor 115 is operating via the use of a charge controller 125. A wireless receiver 130 provides the remote operation of the electric motor 115 and will be described in greater detail hereinbelow.

Figure 5:
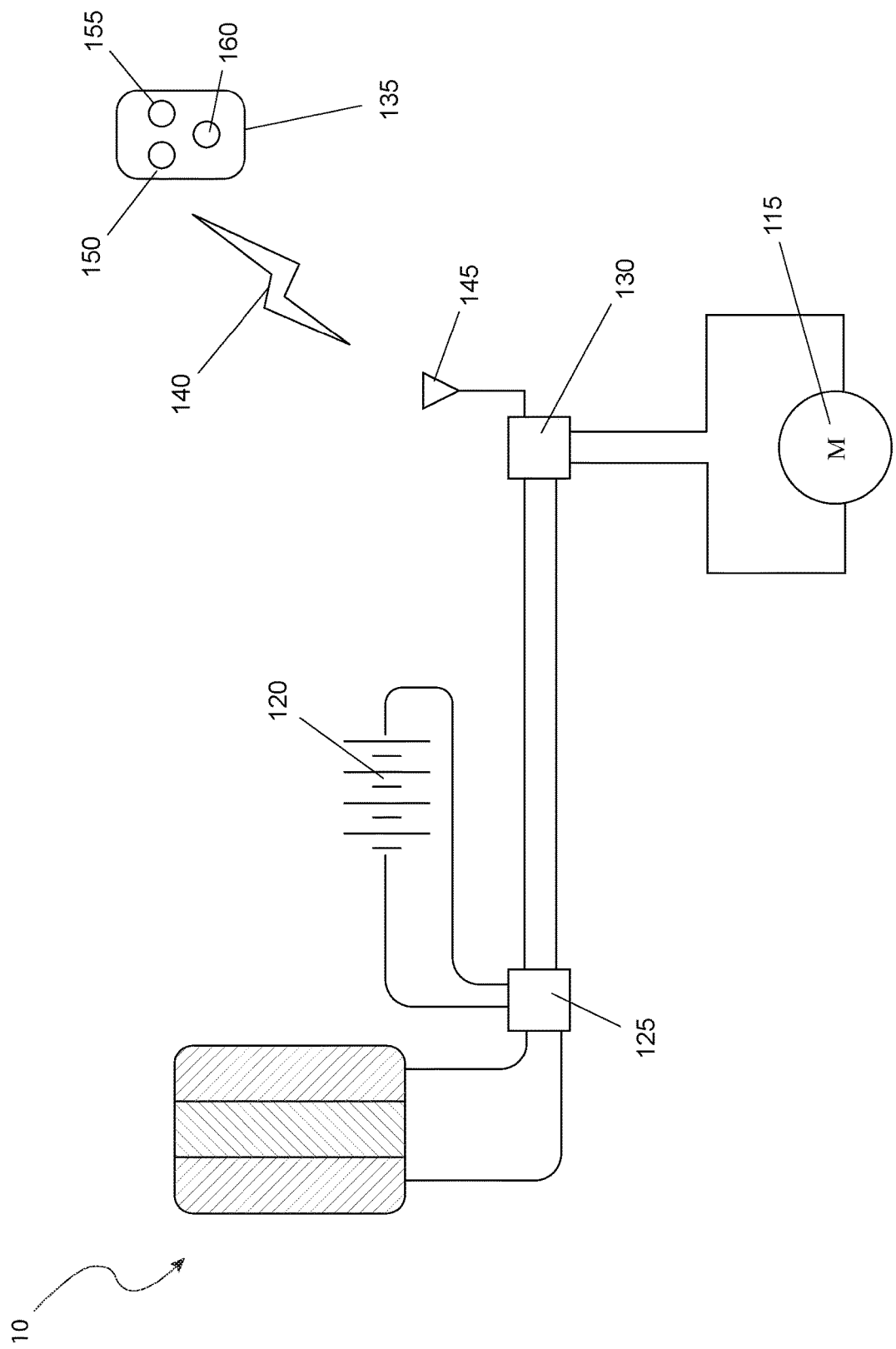

Referring finally to FIG. 5, an electrical block diagram of the device 10, according to the preferred embodiment of the present invention is depicted. Electric power as generated by the photovoltaic panel 85 is routed to the charge controller 125. The charge controller 125 is capable of charging the rechargeable batteries 120. When power is required by the device 10, the charge controller 125 will pull power from either the photovoltaic panel 85 or the rechargeable batteries 120 depending on the ambient light levels available. The wireless receiver 130 then controls the power that is applied to the electric motor 115. A remote-control fob 135 generates an RF signal 140 which communicates with an antenna 145 connected to the wireless receiver 130. The remote-control fob 135 is equipped with a left mirror pushbutton 150 and a right mirror pushbutton 155 to allow the driver to select either the driver's side view mirror equipped with the device 10 or a passenger side mirror equipped with the device 10 respectively. Once selected by either the left mirror pushbutton 150 or the right mirror pushbutton 155, the driver would push the activation pushbutton 160 to activate the electric motor 115 on the respective unit. The operation of the device 10 does not require the use of any dash-mounted switches or permanent alterations to the interior of the vehicle. The remote-control fob 135 is envisioned to be powered by a long-life user-replaceable coin-style battery.

2. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as automotive supply stores, discount stores, truck stops, mail order and internet supply houses and the like. Special attention would be paid to any particular mounting requirements of the device 10 with regards to the specific configuration of the mirror 15 upon which it is used.

After procurement and prior to utilization, the device 10 would be prepared in the following manner: the enclosure 40 would be slipped over the top of the rear mirror body 80 and the frame 30 of the mirror 15; the wiper arm 50 would be positioned upon the glass mirror surface 20 and the clear elastic strip 75 would be secured around the top portion of the frame 30 as shown in FIGS. 1, 2, and 3. This process would be repeated for driver and/or passenger mirrors as desired. At this point in time, the device 10 is ready for utilization.

During utilization of the device 10, the following procedure would be initiated: the rechargeable batteries 120 in the enclosure 40 would be recharged whenever the photovoltaic panel 85 is exposed to incoming sun rays 100; during rain, snow, or other inclement weather, the driver would select either the driver's mirror or passenger mirror using either the left mirror pushbutton 150 or the right mirror pushbutton 155 respectively; the activation pushbutton 160 would then be pressed to activate the electric motor 115; rotatory action from the electric motor 115 is transformed into reciprocating action by the reciprocating gearing mechanism 110 resulting in the wiper frame 60 and the connected rubber wiping strip 95 travelling across the glass mirror surface 20 along the blade travel path "b" 70, thus cleaning it; when cleaning is no longer needed, the activation pushbutton 160 is released.

After use of the device 10, it may be left in place or removed by sliding up along the installation removal travel path "d" 90 where it can be stored until needed again on the same or different vehicle in a repeating cyclical manner.

The features of the device 10 are envisioned to provide the following benefits over conventional mirror cleaning methods: increases clear vision when making lane changes, turns, or exits; enhances visibility by removing dust, dirt, bird droppings, tree sap, and the like, is detachable; requires no alteration to the installed vehicle, "green" product that is solar powered with a long lasting battery, and does not block vision in mirror when not being used.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An attachable wiper device, comprising:
   an enclosure having a top, a center, and a side, the enclosure is temporarily attached to a mirror frame using a clear elastic strip, the clear elastic strip will adapt to a different-sized frame to allow for a tight friction fit that remains in place while a vehicle is traveling high speeds;
   a wiper arm having an interior, the wiper arm extends from the center of the enclosure;
   a wiper frame mechanically connected to a distal end of the wiper arm, the wiper frame travels back and forth across a glass mirror surface along a blade travel path while the wiper frame remains in a near vertical position;
   a knuckle mechanically connected to the wiper arm and the wiper frame; and
   a replaceable rubber wiping strip secured to the wiper frame.

2. The attachable wiper device, according to claim 1, wherein an outer surface of the enclosure is equipped with a photovoltaic panel that provides a plurality of electric power for the attachable wiper device.

3. The attachable wiper device, according to claim 2, wherein the photovoltaic panel curves around the top of the enclosure and the side of the enclosure such that one or more surfaces of the photovoltaic panel are intercepting a plurality of incoming sun rays whether they are high or low in a sky.

4. The attachable wiper device, according to claim 2, wherein the electric power as gathered by the photovoltaic panel is stored in a plurality of rechargeable batteries allowing for operation of the attachable wiper device during night time hours, during times of diminished ambient lighting, during a rain storm or during a snow storm.

5. The attachable wiper device, according to claim 4, wherein the photovoltaic panel continuously recharges the rechargeable batteries whether or not an electric motor is operating via a charge controller.

6. The attachable wiper device, according to claim 5, wherein the knuckle is connected to a reciprocating gearing mechanism which converts a rotary action of the electric motor to a back-and-forth action required by the blade travel path.

7. The attachable wiper device, according to claim 5, wherein the charge controller pulls electric power from either the photovoltaic panel or the rechargeable batteries depending on an ambient light level available when the electric power is required by the attachable wiper device.

8. The attachable wiper device, according to claim 5, wherein the electric power generated by the photovoltaic panel is routed to the charge controller.

9. The attachable wiper device, according to claim 5, further comprising a wireless receiver allows remote operation of the electric motor.

10. The attachable wiper device, according to claim 9, further comprising a remote-control FOB that generates an RF signal which communicates with an antenna connected to the wireless receiver.

11. The attachable wiper device, according to claim 1, wherein the interior of the wiper arm includes a tension spring to ensure that the blade travel path maintains adequate contact with the glass mirror surface.

12. The attachable wiper device, according to claim 11, wherein a remote-control FOB is equipped with a left mirror pushbutton and a right mirror pushbutton to allow a driver to select either a driver's side view mirror equipped with the attachable wiper device or a passenger side mirror equipped with the attachable wiper device respectively.

13. The attachable wiper device, according to claim 12, wherein the driver would push an activation pushbutton to activate the electric motor once selected by either the left mirror pushbutton or the right mirror pushbutton.

14. The attachable wiper device, according to claim 11, wherein the remote-control FOB is powered by a long-life user-replaceable coin-style battery.

15. The attachable wiper device, according to claim 1, wherein the attachable wiper device is an add-on device for remote cleaning of a mirror on the vehicle using a large rear view mirror selected from the group consisting of a tractor-trailer rig, a travel bus, a school bus, a recreational vehicle coach, or a piece of farm equipment.

16. The attachable wiper device, according to claim 15, wherein the mirror includes the glass mirror surface, an auxiliary mirror, the mirror frame, and a support arm.

17. The attachable wiper device, according to claim 15, wherein the mirror is a driver's side view mirror.

18. The attachable wiper device, according to claim 15, wherein the mirror is a passenger side view mirror.

19. The attachable wiper device, according to claim 1, wherein the attachable wiper device is manually installed without one or more tools.

20. The attachable wiper device, according to claim 1, wherein the attachable wiper device does not require the use of one or more dash-mounted switches or one or more permanent alterations to an interior of the vehicle.

* * * * *